(12) United States Patent
Reed et al.

(10) Patent No.: US 7,633,485 B2
(45) Date of Patent: Dec. 15, 2009

(54) SINGLE KNOB MULTIFUNCTION CONTROLLER AND DISPLAY UNIT

(75) Inventors: Fred Reed, Rochester Hills, MI (US); Robert P Hennessee, Rochester Hills, MI (US); David M Zedan, New Baltimore, MI (US); Andrew Gillen, Troy, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 1390 days.

(21) Appl. No.: 10/767,583

(22) Filed: Jan. 29, 2004

(65) Prior Publication Data

US 2005/0168435 A1 Aug. 4, 2005

(51) Int. Cl.
G09G 5/00 (2006.01)
(52) U.S. Cl. .................................. 345/156; 345/184
(58) Field of Classification Search .............. 345/184, 345/156, 164–165, 902; 340/425.5; 307/9.1, 307/10.1; 200/11 R, 12–14, 17 R, 18, 17 A–17 B, 200/5 R; 362/23, 27–30
See application file for complete search history.

(56) References Cited

U.S. PATENT DOCUMENTS

| | | | |
|---|---|---|---|
| 4,910,503 A | 3/1990 | Brodsky | |
| 5,270,689 A | 12/1993 | Hermann | |
| 6,005,299 A | 12/1999 | Hengst | |
| 6,154,201 A | 11/2000 | Levin | |
| 6,176,589 B1 * | 1/2001 | Ishiguro | 362/27 |
| 6,208,342 B1 * | 3/2001 | Mugura et al. | 715/810 |
| 6,337,469 B1 * | 1/2002 | Chung | 219/506 |
| 6,392,640 B1 * | 5/2002 | Will | 345/184 |
| 6,636,197 B1 * | 10/2003 | Goldenberg et al. | 345/156 |
| 6,769,320 B1 * | 8/2004 | Bollgohn et al. | 73/866.3 |
| 2002/0032019 A1 * | 3/2002 | Marks et al. | 455/414 |
| 2004/0046751 A1 * | 3/2004 | Heimermann et al. | 345/184 |

FOREIGN PATENT DOCUMENTS

DE 101 21 396 A1 11/2002

* cited by examiner

Primary Examiner—Richard Hjerpe
Assistant Examiner—Mansour M Said
(74) Attorney, Agent, or Firm—Ralph E. Smith

(57) ABSTRACT

A human-machine interface device for controlling a plurality of vehicle functions. The interface has a knob which is bidirectionally rotatable at a rest level and a pressed level. A selected one of the vehicle functions is selected by the knob at the rest level, and the selected one of the vehicle functions is controlled by the knob at the pressed level.

11 Claims, 1 Drawing Sheet

SINGLE KNOB MULTIFUNCTION CONTROLLER AND DISPLAY UNIT

FIELD OF INVENTION

The present invention relates generally to human-machine interfaces, and more particularly to such interfaces having a rotatable knob which is linearly translatable along the axis of rotation.

BACKGROUND

Modern vehicles contain a number of systems which require input from the driver or its occupants. Examples of such systems include climate control, navigation, audio entertainment, video entertainment, and body control. As the number of systems increase and the functionality of each system increases, there is also an increasing demand for users of the systems to provide input. For example, climate control systems have evolved from needing a user to set a desired temperature for the entire passenger compartment to needing input for a desired temperature in each zone of the vehicle, such as the driver's area, front passenger's area, and the remaining area of the vehicle extending from behind the first seating row.

Using a conventional interface method of dedicated buttons and other control devices to provide input to each system requires that an undesirably large percentage of the vehicles interior surface be covered with these devices. Also, the large number of devices may become undesirably expensive to produce and challenging to assemble quickly and accurately.

SUMMARY OF INVENTION

Accordingly, one aspect of the present invention is to provide a human-machine interface which is desirable for providing input to vehicle system.

Another aspect of the present invention is to provide a human-machine interface which may be economical to produce and assemble into a vehicle.

In accordance with these aspects, a human-machine interface device is provided for controlling a plurality of vehicle functions. The interface has a knob which is bidirectionally rotatable at a rest level and a pressed level. A selected one of the vehicle functions is selected by the knob at the rest level, and the selected one of the vehicle functions is controlled by the knob at the pressed level.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

DETAILED DESCRIPTION

The following description of the preferred embodiments is merely exemplary in nature and is in no way intended to limit the invention, its application or uses.

Figure 1:
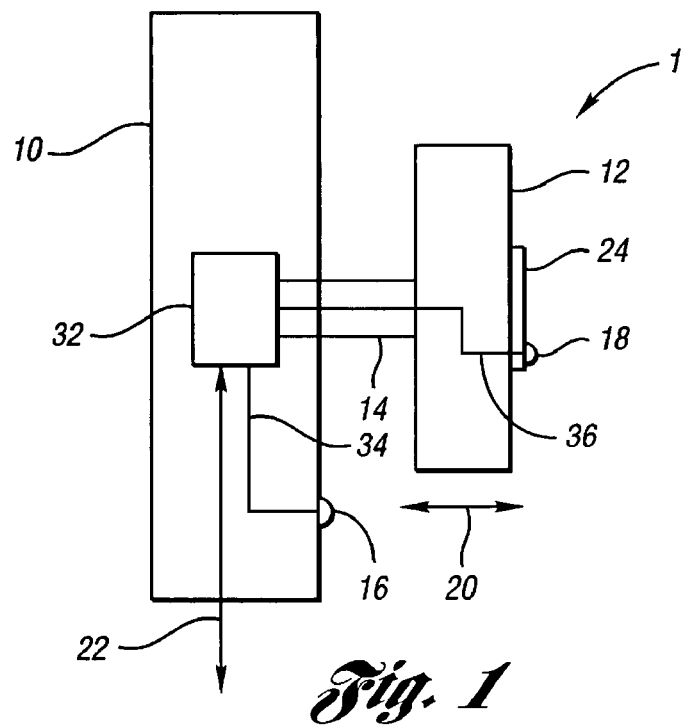
FIG. 1 illustrates a side view of a human-machine input device.

Turning to FIG. 1, a multifunction interface 1 is shown in side view. A housing 10 contains an electronics assembly 34. A knob 12 is connected to the electronics assembly 32 by a shaft 14. The knob 12 is rotatable about the axis of shaft 14 and is also linearly translatable along the axis of shaft 14 to first and second positions as indicated by bidirectional arrow 20. A connection 22 provides for communication between circuitry 32 and the system connected to interface 1. Additionally, an indicator 16, such as a lamp or LED, may be connected to the circuitry 32 via connection 34. One or more buttons 24 may be located within the face of knob 12. A button 24 may include a button mounted indicator 18, such as a lamp or LED, which is connected to circuitry 32 via connection 36.

Figure 2:
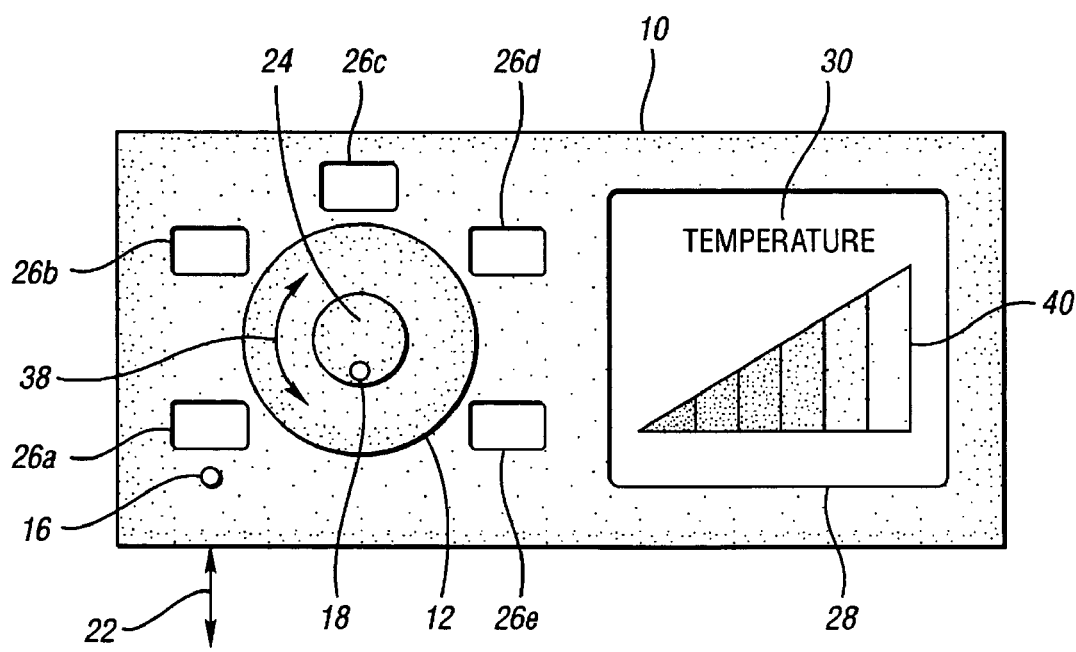
FIG. 2 illustrates a front view of a human-machine input device.

Turning now to FIG. 2, a multifunction interface 1 is shown in front view. Knob 12 may be rotated clockwise and counterclockwise as indicated by bidirectional rotation arrow 38. Knob 12 may also be pressed, thereby translating it towards the housing 10. Knob 12 may also be rotated while it is pressed. Function annunciators 26a-e may be positioned on the housing 10, as may be a display 28. The display 28 may provide information regarding the vehicle system receiving input from the interface 1 by displaying a function label 30 and a function representation 40.

Operation of interface 1 will now be explained by non-limiting example. While interface 1 may be used to control one or more vehicle systems, climate control will be used in this example. Examples of systems include audio entertainment, video entertainment, and navigation.

Knob 12 rotates about an axis. Knob 12 may also be pressed from a rest level to a pressed level, where it is also rotatable. When pressed, knob 12 translates linearly down the axis of rotation from the rest level to the pressed level. When released, a bias element, such as a spring coaxial with shaft 14, urges knob 12 from the pressed level back to the rest level. Rotating knob 12 at the rest level selects the function that will be controlled. In climate control, these functions may include defrost, blower speed, floor/vent mode, temperature, and automatic mode. Detents may be associated with each function such knob 12 may be rotated at the rest level and the detents may be sensed by a user to determine when the next function has been selected. Once the desired function is selected, knob 12 is depressed to the pressed level and then rotated to control the desired function. For example, if the temperature function was selected with knob 12 at the rest level, then the temperature may be adjusted by rotating knob 12 while it is depressed to the pressed position. The new desired temperature may then be accepted immediately by the climate control system, or the system may wait until knob 12 is released before accepting the new desired temperature.

If used, each function annunciator 26a-26e may be associated with a system function, i.e. defrost, blower speed, floor/vent mode, temperature, and automatic mode, respectively. As knob 12 is rotated at the rest level, each annunciator illuminates exclusive of the others to indicate which function is selected for control. For some functions, such as defrost, it is desirable to provide an indicator 16 to inform the user whether the selected function is on or off regardless of whether knob 12 is being rotated or pressed.

One or more buttons 24 may be located within the face of knob 12. A button 24 may be used to control a function which has an on/off operation, such as a rear window defroster and an air conditioning request. A button mounted indicator 18, such as a lamp or LED, may be used to indicate whether the function associated with a button 18 is turned on.

A display 28 may also be provided for indicating which function is selected by knob 12 at its rest level. The display may provide a function label 30 to indicate the selected function. A function representation 40 may also be shown on the display to reflect adjustments made to the selected function while knob 12 is pressed and rotated.

What is claimed is:

1. A human-machine interface device for controlling a plurality of vehicle functions, the interface comprising:
    a knob which is bidirectionally rotatable at a rest level and a pressed level;
    a selected one of said vehicle functions being selected by said knob at said rest level;
    said selected one of said vehicle functions being controlled by said knob at said pressed level; and
    a plurality of annunciators, wherein one of said annunciators indicates said selected one of said vehicle functions when said knob is rotated at said rest level wherein at least one of said vehicle functions is an on/off function, and wherein said knob further comprises a switch for controlling said on/off function and said switch includes an indicator reflective of the state of said on/off function.

2. The human-machine interface of claim 1 wherein each of said vehicle functions is associated with a detent position of said knob at said rest level.

3. The human-machine interface of claim 1 wherein at least one of said annunciators indicates said selected one of said vehicle functions when said selected one of said vehicle functions is controlled by rotating said knob at said pressed level.

4. The human-machine interface of claim 1 further comprising a display screen indicating said selected one of said vehicle functions is controlled by said knob at said pressed level.

5. The human-machine interface of claim 1 wherein said selected functions comprise a fan speed and a temperature.

6. A human-machine interface device for controlling a plurality of vehicle functions, the interface comprising:
    a knob which is bidirectionally rotatable at a first level and a second level;
    a selected one of said vehicle functions being selected by said knob at said first level;
    said selected one of said vehicle functions being controlled by said knob at said second level; and
    a plurality of annunciators, wherein one of said annunciators indicates said selected one of said vehicle functions when said knob is rotated at said first level wherein at least one of said vehicle functions is an on/off function, and wherein said knob further comprises a switch for controlling said on/off function and said switch includes an indicator reflective of the state of said on/off function.

7. The human-machine interface of claim 6 wherein each of said vehicle functions is associated with a detent position of said knob at said first level.

8. The human-machine interface of claim 6 wherein at least one of said annunciators indicates said selected one of said vehicle functions when said selected one of said vehicle functions is controlled by said knob at said pressed level.

9. The human-machine interface of claim 6 further comprising a display screen indicating said selected one of said vehicle functions is controlled by said knob at said second level.

10. The human-machine interface of claim 6 wherein said selected functions comprise a fan speed and a temperature.

11. In a vehicle having a plurality of functions for controlling by a user, a method for selecting and controlling the functions, the method comprising: selecting one of said functions by rotating a knob at a first level about an axis of rotation; translating said knob along said axis of rotation to a second level; controlling said one of said functions by rotating said knob at said second level; indicating said one of said functions using an annunciator when said one of said functions is selected by rotating said knob at said first level; wherein at least one of said vehicle functions is an on/off function, and wherein said knob further comprises a switch for controlling said on/off function and said switch includes an indicator reflective of the state of said on/off function.

* * * * *